US00RE35647E

United States Patent [19]

Simeth

[11] E Patent Number: Re. 35,647

[45] Reissued Date of Patent: Nov. 4, 1997

[54] PLATE CYLINDER HOLDER WITH SLIDE RAIL CIRCULAR BEARING ASSEMBLY

[75] Inventor: Claus Simeth, Geisenheim, Germany

[73] Assignee: Man Roland Druckmaschinen AG, Germany

[21] Appl. No.: 597,865

[22] Filed: Feb. 7, 1996

Related U.S. Patent Documents

Reissue of:

[64] Patent No.: 5,284,092
Issued: Feb. 8, 1994
Appl. No.: 37,309
Filed: Mar. 26, 1993

[30] Foreign Application Priority Data

Apr. 2, 1992 [DE] Germany ..... 4210897

[51] Int. Cl.[6] ..... B41F 13/10

[52] U.S. Cl. ..... 101/378; 101/409; 101/415.1

[58] Field of Search ..... 101/415.1, 378, 101/409, 410

[56] References Cited

U.S. PATENT DOCUMENTS

| | | | |
|---|---|---|---|
| 2,737,887 | 3/1956 | Gericke | 101/415.1 |
| 2,998,768 | 9/1961 | Norlin | 101/415.1 |
| 3,017,830 | 1/1962 | Penner | 101/415.1 |
| 3,025,790 | 3/1962 | Larsen | 101/415.1 |
| 3,151,554 | 10/1964 | Townsend | 101/415.1 |
| 3,188,952 | 6/1965 | Miller | 101/415.1 |
| 3,417,696 | 12/1968 | Koch et al. | 101/409 |
| 3,858,512 | 1/1975 | Simeth | 101/415.1 |
| 3,884,147 | 5/1975 | Abendroth | 101/415.1 |
| 3,899,972 | 8/1975 | Albright | 101/415.1 |
| 3,903,796 | 9/1975 | Jeschke et al. | 101/415.1 |
| 4,006,686 | 2/1977 | Ackerman | 101/415.1 |
| 4,092,923 | 6/1978 | Bollmer | 101/415.1 |
| 4,596,188 | 6/1986 | Bonomi | 101/415.1 |
| 4,688,483 | 8/1987 | Schollenberger | 101/415.1 |
| 4,712,476 | 12/1987 | Jeschke | 101/415.1 |
| 4,831,931 | 5/1989 | Jeschke et al. | 101/415.1 |
| 4,864,930 | 9/1989 | Runyan et al. | 101/365 |
| 4,938,135 | 7/1990 | Wieland | 101/415.1 |
| 5,088,408 | 2/1992 | Philpot | 101/415.1 |
| 5,088,409 | 2/1992 | Roskosch | 101/415.1 |
| 5,088,410 | 2/1992 | Murakami | 101/415.1 |
| 5,097,763 | 3/1992 | Simeth | 101/392.1 |
| 5,167,186 | 12/1992 | Honkawa et al. | 101/415.1 |
| 5,168,810 | 12/1992 | Kojima | 101/415.1 |
| 5,189,958 | 3/1993 | Tafel et al. | 101/415.1 |
| 5,199,352 | 4/1993 | Sugiyama | 101/378 |
| 5,284,092 | 2/1994 | Simeth | 101/378 |
| 5,317,968 | 6/1994 | Saitou et al. | 101/415.1 |
| 5,317,972 | 6/1994 | Honkawa et al. | 101/415.1 |
| 5,361,697 | 11/1994 | Stellberger | 101/415.1 |
| 5,361,698 | 11/1994 | Simeth | 101/415.1 |

FOREIGN PATENT DOCUMENTS

| | | |
|---|---|---|
| 0269816 | 8/1988 | European Pat. Off. . |
| 2501511 | 6/1983 | Germany . |
| 2501511C2 | 6/1983 | Germany . |
| 232730 | 8/1987 | Germany . |
| 426022 | 5/1991 | Germany . |
| 3933678 | 8/1991 | Germany . |
| 3936446 | 8/1991 | Germany . |
| 3936446C2 | 8/1991 | Germany . |
| 7216860 | 4/1992 | Germany . |
| 60-72731 | 4/1985 | Japan . |
| 62-56146 | 3/1987 | Japan . |
| 63-53034 | 10/1988 | Japan . |
| 1108046 | 4/1989 | Japan . |
| 3190736 | 8/1991 | Japan . |
| 57261 | 8/1945 | Netherlands . |

*Primary Examiner*—Eugene H. Eickholt
*Attorney, Agent, or Firm*—Graham & James LLP

[57] ABSTRACT

A printing machine plate cylinder having a plate tensioning slide rail adjustably mounted within a hollow of the cylinder. The slide rail is supported by a plurality of roller ring modules which stably support the slide rail and permit easy and exact movement of the slide rail in any direction in the adjusting plane.

20 Claims, 3 Drawing Sheets

PLATE CYLINDER HOLDER WITH SLIDE RAIL CIRCULAR BEARING ASSEMBLY

Matter enclosed in heavy brackets [ ] appears in the original patent but forms no part of this reissue specification; matter printed in italics indicates the additions made by reissue.

FIELD OF THE INVENTION

The present invention relates generally to plate cylinders for printing presses, and more particularly, to plate cylinders having an adjustable slide rail for tensioning a printing plate about the cylinder.

BACKGROUND OF THE INVENTION

Plate cylinders are known which have at least one adjustable slide rail disposed in a hollow or recess of the plate cylinder for tensioning a plate mounted on the cylinder. German patent 3,843,395 discloses a so-called flat pass guide for the adjustment of the slide rail in which a flat bottomed surface of a slide rail can be moved on the flat top of a guide. Such known flat pass guides cannot be controlled well, particularly when subjected to forces. For example, a tilting of the slide rail can occur when large forces act upon it. Such slide rails also often cannot be adjusted in all directions in the plane of adjustment, which runs parallel to the tangential plane of the plate cylinder, but instead are adjustable only in a circumferential direction. In other known devices of such type, adjustment in the circumferential direction makes further adjustment in an axial direction necessary, since the adjustments in the two mutually perpendicular directions cannot be completed independently of each other.

OBJECTS AND SUMMARY OF THE PRESENT INVENTION

It is an object of the present invention to provide a printing plate cylinder having an improved plate tensioning and adjusting slide rail which is selectively adjustable in all directions in the adjusting plane.

Another object is to provide a plate cylinder slide rail as characterized above which is stably and exactly mountable and can be easily and accurately moved in the adjusting plane to the desired degree.

A further object is to provide a printing plate slide rail of the above kind which is relatively simple in construction and economical in manufacture.

Other objects and advantages of the invention will become apparent upon reading the following detailed description and upon reference to the drawings, in which:

Figure 1:
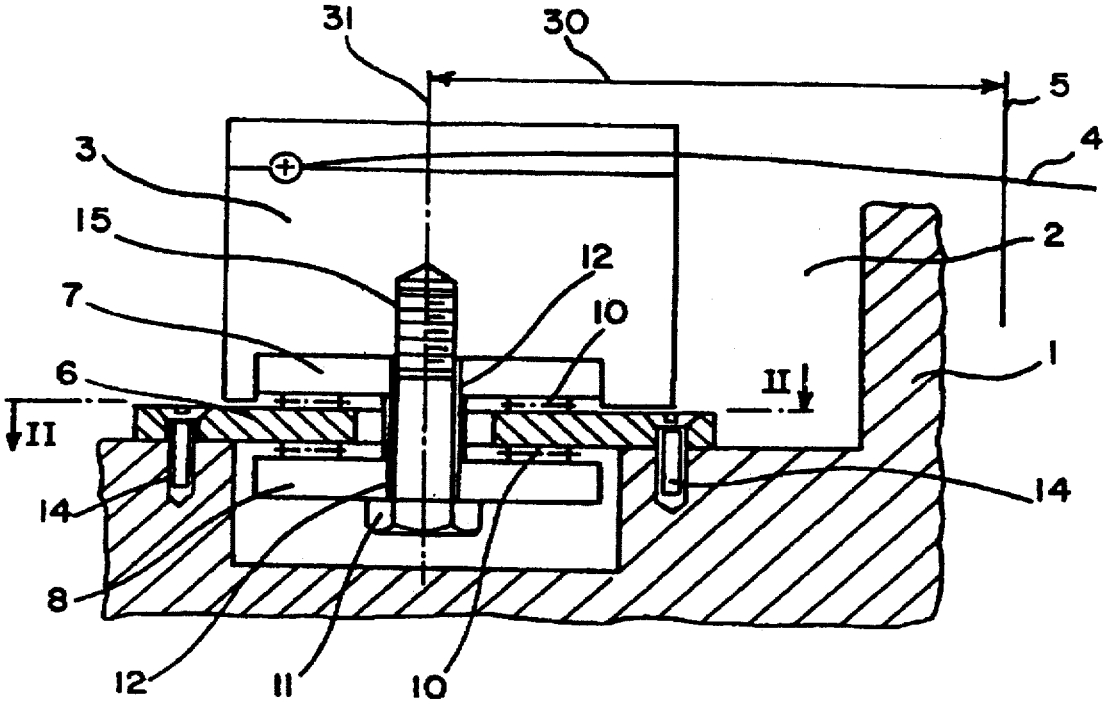
FIG. 1 is a partially diagrammatic axial section of a plate cylinder having an adjustable slide rail in accordance with the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Referring now more particularly to the drawings, there is shown a printing machine plate cylinder 1 having a printing plate 4 mounted thereon. The plate cylinder 1 is formed with a cylindrical hollow or recess 2, within which a slide rail 3 is mounted. The printing plate 4 has one end fastened to the slide rail 3 which is adjustable for tensioning and positioning the plate 4 on the cylinder 1, the pressing starting point of which is indicated as position 5 in FIG. 1. It will be understood by one skilled in the art that the other end of the printing plate may be fastened to a similar slide rail, or alternatively, it may be held in any suitable conventional manner, for example by spring loaded pins which are inserted into holes cut into the end of the printing plate.

In accordance with the invention, for enabling easy and exact adjustable movement of the slide rail, the slide rail is supported by at least two roll bodies of an axial bearing disposed in the adjusting plane of the slide rail. More particularly, the slide rail is supported by a plurality of roll bodies arranged in respective circular cages to form modular units which permit free movement of the slide rail in all directions in the adjusting plane. To this end, in the illustrated embodiment, the slide rail 3 is supported for movement by a plurality of axially spaced roller ring module units 9 each comprising a plurality of roll bodies 10, which may be rollers or balls, arranged in a circular arrangement in a circular cage 10a.

In order to support the roller ring modules 9 such that they can follow adjustable movement of the slide rail 3 within the printing cylinder hollow 2, each module unit 9 has a respective fastening plate 6 secured to the plate cylinder 1 by screws 14. For enhancing the stability of the slide rail 3 mounting, roller rings modules 9 are disposed on opposite sides of the fastening plate 6 and are retained between upper and lower cover disks, 7, 8, respectively. For retaining the cover disks 7, 8, and the roller ring modules 9 in assembled relation, a fastening screw 11 is positionable through respective holes 12 in the cover disks 7, 8 and a hole 13 in the fastening plate 6. The screw 11 threadedly engages a tapped hole 15 in the underside of the slide rail 3. The upper cover disk 7 in this case is supported within a recess in the underside of the slide rail 3, and the slide rail 3, upper cover disc 7, lower cover disc 8, and the roller ring modules 9 interposed between the cover discs 7 and 8 and the fastening plate 6 all are maintained in assembled relation by the fastening screw 11.

For permitting free movement of the slide rail 3, cover discs 7 and 8, and roller ring modules 9 relative to the fastening plate 6, the fastening plate hole 13 is elongated in a direction transverse to the longitudinal axis of the slide rail and also is larger than the shank of the fastening screw 11 in the longitudinal direction of the slide rail. By such arrangement, it can be seen that pairs of longitudinally spaced roller ring module units 9 can be retained within the hollow 2 of the plate cylinder 1 by a respective fastening plate 6, while permitting free movement of the slide rail 3 in all directions of the adjusting plane. It will be understood by one skilled in the art that the roller ring module units 9 can be assembled in mounted relation on the slide rail 3 prior to securing the fastening plates 6 to the plate cylinder 1, thereby simplifying assembly and service.

Figure 2:
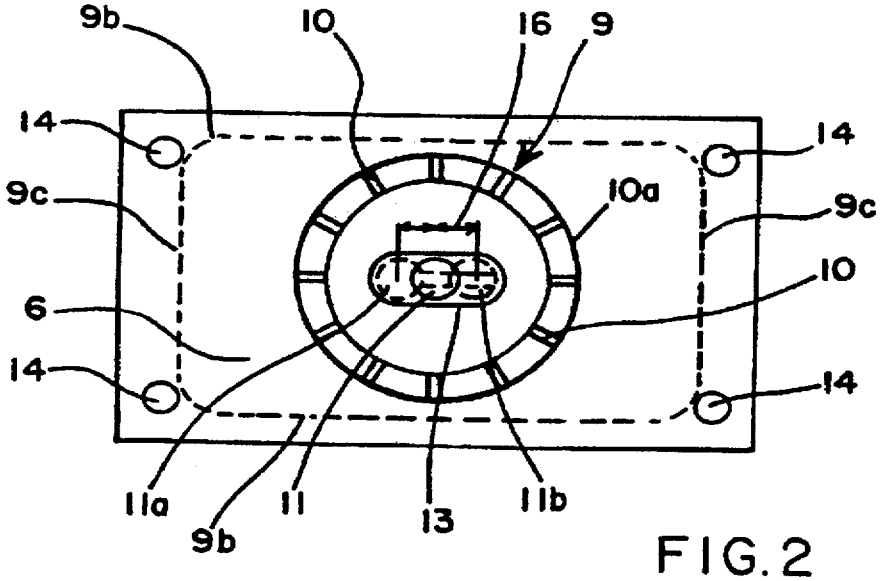
FIG. 2 is a longitudinal section taken in the plane of line II—II in FIG. 1, showing different positions of a roller ring module unit for the slide rail mounting.
Figure 3:
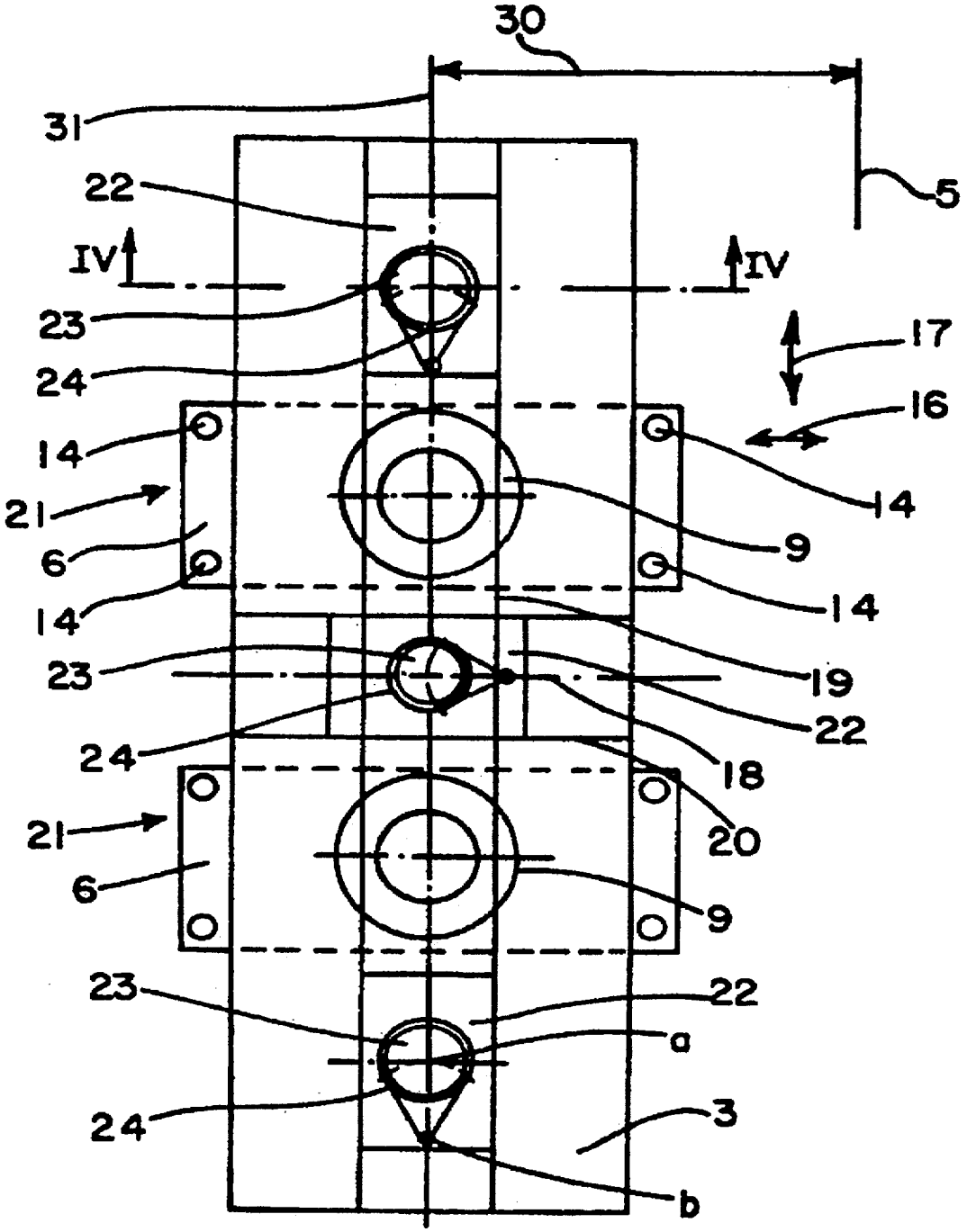
FIG. 3 is a top view of the slide rail shown in FIG. 1.

With the slide rail 3 mounted in the hollow 2 of the plate cylinder in such manner, when forces are applied to the slide rail, it is freely movable in all possible directions in the adjusting plane II—II, as indicated in FIG. 1 within limits of the hole 13 in the fastening plate 6. As depicted in FIG. 2, the shank of the screw 12 is positionable between the dotted line positions 11a and 11b as depicted by the positioning arrow 16, and the roller ring modules 9 are positionable in one direction between the dotted lines 9a and in transverse direction between the dotted lines 9b. It will be appreciated that adjustment in the direction of the arrow 16, as shown in FIGS. 2 and 3 will affect stretching or loosening of the printing plate about the plate cylinder and movement of the slide rail in the direction of the arrow 17 will affect axial shifting of the slide rail and the printing plate for side registration.

Figure 4:
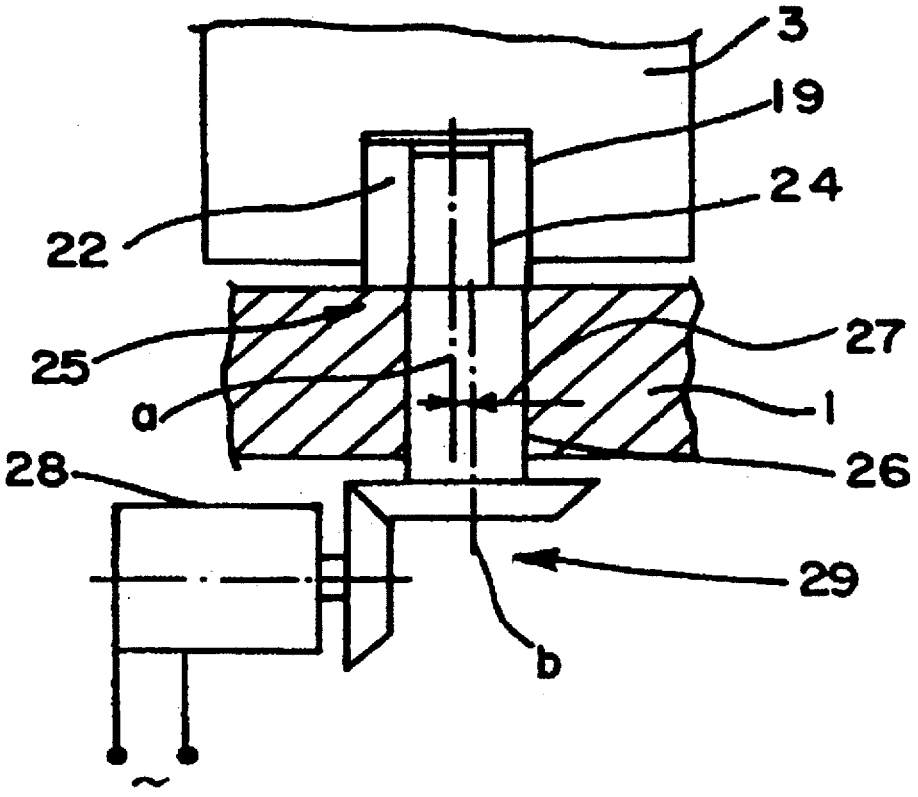
FIG. 4 is a fragmentary section taken in the plane of line IV—IV in FIG. 4, showing a motor operated slide rail adjusting means.

In keeping with the invention, to selectively and exactly adjust the slide rail, respective eccentric adjusting means are provided for moving the slide rail in circumferential and axial directions with respect to the plate cylinder. For this purpose, the underside of the slide rail 3 is formed with a center slot 19 oriented in a circumferential direction, and longitudinal slots 19 parallel to the axis of the cylinder are formed in the underside of the slide rail 3 adjacent its opposite ends. Cross heads 22 are provided in each of the slots 19, 22, the cross heads being formed with planes as smooth as possible for movement in the slots free from play. As depicted in FIG. 4, the cross heads 22 each having center borings 13 in which pins 24 of eccentrics 25 engage. The pins 24 are arranged eccentrically to a cylindrical part 26 of the eccentric 25. The eccentricity illustrated in FIG. 4 by the positioning arrow 27, results from the distance from the center b of a gear 29 to the axis a of the pin 24. By turning the eccentrics 25, therefore, the respective cross heads 22 can be shifted in slots 19, 20. As a result, the slide rail can be moved in its adjusting plane II—II in each of the circumferential and axial directions depicted by the arrows 16, 17, respectively, and in all directions in between by virtue of a combination of such eccentric actuated movements.

For rotating each eccentric, a drive motor 28 with a gear 29 may be provided. Motor operated adjustment may be effected by virtue of a suitable control so that a machine operator can establish the actual positions of the eccentrics at any time and with it also the actual positions of the slide rail 3. Alternatively, positioning is possible by manual adjustment of the eccentrics. As depicted in FIG. 3, the distance 30 is the distance between the pressing starting point 5 and a starting or neutral position 31 of the slide rail. Starting from this target position, it will be understood by one skilled in the art that the positions of the slide rail can be calculated and adjusted.

From the foregoing, it can be seen that the slide rail mounting of the present invention enables the slide rail to be exactly and stably moved in all directions in the adjusting plane. The slide rail and its mounting also is relatively simple in construction and economical in manufacture.

What is claimed is:

1. A printing machine plate cylinder comprising means for supporting a printing plate about the outer perimeter of the cylinder, means forming a hollow in said cylinder, an elongated slide rail disposed in said hollow, means for securing one end of said printing plate to said slide rail, means for supporting said slide rail for selected movement in an adjusting plane substantially parallel to a plane tangent to the plate cylinder at such location, said supporting means comprising a plurality of roll bodies for enabling free movement of the slide rail in any direction in the adjusting plane.

2. The plate cylinder of claim 1 in which said roll bodies are disposed at longitudinally spaced locations along the length of said slide rail.

3. The plate cylinder of claim 2 in which said roll bodies form a modular bearing unit.

4. The plate cylinder of claim 3 in which said roll bodies are retained in a circular cage and form a roller ring module.

5. The plate cylinder of claim 1 in which said slide rail supporting means includes a fastening plate secured to said plate cylinder within said hollow in a plane parallel to said adjusting plane, and a plurality of said roll bodies disposed on opposite sides of said fastening plate for supporting said slide rail for movement relative to said fastening plate.

6. The plate cylinder of claim 5 including upper and lower cover disks retaining said roller bodies on opposite sides of said fastening plate.

7. The plate cylinder of claim 6 including a fastening screw extending through said cover disks and fastening plate and engaging said slide rail for retaining said cover disks and roll bodies in assembled relation on said fastening plate.

8. The plate cylinder of claim 7 in which said fastening plate is formed with an aperture through which said fastening screw extends, said aperture being larger than said fastening screw for permitting relative movement of said slide rail, fastening screw, and cover disks with respect to said fastening plate.

9. The plate cylinder of claim 4 in which said support means includes a plurality of said roller ring modules disposed at longitudinally spaced locations along the length of said slide rail.

10. The plate cylinder of claim 1 including a first eccentric rotatably supported by said plate cylinder and engaging an underside of said slide rail, said first eccentric being rotatable for moving said slide rail in the adjusting plane in [a circumferential] *an axial* direction with respect to said plate cylinder, a second eccentric, said second eccentric being rotatably supported by said plate cylinder and engageable with said slide rail, and said second eccentric being rotatable to move said [plate cylinder] *slide rail* in [an axial] *a circumferential* direction with respect to said plate cylinder.

11. The plate cylinder of claim 10 in which said first eccentric engages an underside of the slide rail at the center thereof, and including a pair of said second eccentrics each engaging an underside of the slide rail at a location adjacent a respective end thereof.

12. The plate cylinder of claim 10 in which said slide rail is formed with a transverse slot on an underside thereof extending in the circumferential direction with respect to the plate cylinder, a first cross head disposed within said transverse slot for relative movement therein, said first eccentric includes a pin that engages said first cross head and which moves said cross head in said slot in response to rotational movement of said first eccentric, said side rail being formed with a second slot disposed in a longitudinal direction parallel to the axis of said plate cylinder, a second cross head disposed in said second slot for movement therein, and said second eccentric including a pin engaged with said second cross head for moving said second cross head in said second slot in response to rotational movement of said second eccentric.

13. The plate cylinder of claim 12 including motor means for rotating said first and second eccentrics.

*14. A printing cylinder supporting a printing plate on an outer surface thereof, the printing cylinder comprising:*

*a recess formed in the printing cylinder;*

*a slide rail disposed in the recess;*

*a printing plate holding device for securing one end of the printing plate to the slide rail;*

*at least one first eccentric rotatably supported on the printing cylinder and engaging the slide rail, the at least one first eccentric being rotatable for moving the slide rail in a circumferential direction relative to the printing cylinder; and*

*at least one second eccentric rotatably supported on the printing cylinder and engaging the slide rail, the at least one second eccentric being rotatable to move the slide rail in an axial direction relative to the printing cylinder.*

*15. The printing cylinder of claim 14, wherein the at least one first eccentric is located at a central portion of the slide rail.*

*16. The printing cylinder of claim 14, wherein the at least one second eccentric is located at an end portion of the slide rail.*

*17. The printing cylinder of claim 14, further comprising an additional second eccentric rotatably supported on the printing cylinder and engaging the slide rail, the additional second eccentric being rotatable to move the slide rail in an axial direction relative to the printing cylinder.*

*18. The printing cylinder of claim 17, wherein the additional second eccentric is located at one end portion of the slide rail and the at least one second eccentric is located at an opposite end portion of the slide rail.*

*19. The printing cylinder of claim 18, wherein the at least one first eccentric is disposed between the at least one second eccentric and the additional second eccentric.*

*20. The printing cylinder of claim 14, wherein the at least one first eccentric and the at least one second eccentric are arranged to engage an underside of the slide rail.*

* * * * *